United States Patent Office 3,542,722
Patented Nov. 24, 1970

3,542,722
GLASS-REINFORCED COPOLYMERS OF TRI-
OXANE AND PROCESS FOR MAKING THEM
Karl-Heinz Häfner, Bad Orb, and Günther Roos, Kelk-
heim, Taunus, Germany, assignors to Farbwerke
Hoechst Aktiengesellschaft vormals Meister Lucius &
Bruning, Frankfurt am Main, Germany, a corporation
of Germany
No Drawing. Filed Mar. 26, 1968, Ser. No. 715,999
Claims priority, application Germany, Apr. 8, 1967,
F 52,070
Int. Cl. C08g 51/04; C08k 1/02
U.S. Cl. 260—37                                    6 Claims

ABSTRACT OF THE DISCLOSURE

The invention provides glass-reinforced copolymers of trioxane produced by cationic polymerization of trioxane with cyclic ethers or cyclic acetals in admixture with impregnated glass fibers.

---

The present invention relates to glass-reinforced copolymers of trioxane and to a process for making them.

It has been proposed to blend glass fibers, which have been subjected to various pre-treatments, with a powdery polymer and to process the blend on an injection molding machine. Such a pre-treatment consists, for example, of dipping the glass fibers into a solution of the plastics material with which it should be blended after removal of the solvent. It has also been proposed to introduce glass fibers and the powdery polymer separately into an extruder and to mix both components in the entrance zone of the extruder. Still further, endless glass filaments in the form of rovings of 60 to 180 individual filaments are coated with a plastics material in the molten state and then cut to pieces having a length of 3 to 14 millimeters. This latter process has, however, the drawback that the glass fibers are not homogeneously distributed in the granules.

The present invention provides a process for the manufacture of glass-reinforced copolymers of trioxane with cyclic ethers or cyclic acetals which comprises polymerizing, in the presence of a cationic catalyst at a temperature in the range of from −50 to +110° C., 30 to 94.5% by weight of trioxane, 0.1 to 20% by weight of cyclic ethers or cyclic acetals in admixture with 5 to 50% by weight of glass fibers which have been impregnated with silanes or siloxanes containing epoxide groups.

It is preferred to polymerize 50 to 89.5% by weight of trioxane, 0.5 to 10% by weight of cyclic ethers or cyclic acetals in admixture with 10 to 40% by weight of impregnated glass fibers. Products having especially favorable properties are obtained by polymerizing 60 to 80% by weight of trioxane and 1 to 5% by weight of cyclic ethers or cyclic acetals in admixture with 15 to 35% by weight of impregnated glass fibers.

The silanes or siloxanes used preferably contain 1 to 3 epoxide groups and 1 to 3 silicon atoms in the molecule. The following compounds are suitable, for example:

trimethoxy-[3-(2,3-epoxy-propyloxy)-propyl]-silane,
trimethyl-[3-(2,3-epoxy-propyloxy)-propyl]-silane,
methyldiethyl-[3-(2,3-epoxy-propyloxy)propyl]-silane,
dimethylhexyl-[3-(2,3-epoxy-propyloxy)-propyl]-silane,
dimethyl-bis-[3-(2,3-epoxy-propyloxy)-propyl]-silane,
methyl-tris-[3-(2,3-epoxy-propyloxy)-propyl]-silane,
pentamethyl-(3,4-epoxy-butyl)-disiloxane,
tetramethyl-[3-(2,3-epoxy-propyloxy)-propyl]-di-
  siloxane,
heptamethyl-[3-(2,3-epoxy-propyloxy)-propyl]-tri-
  siloxane.

For impregnating glass fibers that are free from size and coupling agent are mixed, at 20 to 30° C. in the presence of a small amount of water, with 0.1 to 2% by weight, preferably 0.2 to 1% by weight, calculated on the glass fibers, of an epoxide group-containing silane or siloxane, and then dried at 50° C. under reduced pressure.

Cyclic ethers or cyclic acetals to be used as cocomponents in the polymerization according to the invention are compounds of the general formula

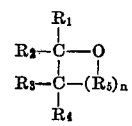

in which $R_1$ to $R_4$ are either identical or different from one another and represent hydrogen atoms, alkyl radicals or halogen-substituted alkyl radicals and $R_5$ stands for a methylene or oxymethylene radical each of which may be substituted by alkyl or halogen-alkyl groups, $n$ being zero or a whole number in the range of from 1 to 3 or $R_5$ stands for the group $-(O-CH_2-CH_2)_m-O-CH_2$, $n$ being 1 and $m$ being a whole number from 1 to 3.

The alkyl radicals having 1 to 5 carbon atoms and may carry as substituents up to 3 halogen atoms, preferably chlorine atoms. It is very suitable to use cyclic ethers with 3 to 5 ring members or cyclic acetals with 5 to 9 ring members. Especially suitable cyclic ethers are ethylene oxide, propylene oxide, epichlorohydrin and oxacyclobutane and especially suitable cyclic acetals or cyclic formals, for example, 1,4-butane-diol formal, diethylene glycol formal and 1,3-dioxolane, ethylene oxide being preferred. It is also suitable to use cyclic formals of unsaturated aliphatic diols and diglycidyl ethers of aliphatic diols, for example 1,4-butene-diol formal and 1,4-butane-diol diglycidyl ether.

It is known that the mechanical properties of glass-reinforced thermoplastics depend on the length and the thickness of the glass fibers. The final length of the glass fibers not only depends on the original length but also on the method of incorporation and the processing conditions. In the process of the invention the glass fibers used advantageously have a diameter of 5 to 12 microns and an average length of 0.1 to 1.0 millimeter. In the final product the glass fibers have an average length of about 0.1 to 0.5 millimeter.

The cationic polymerization can be carried out according to a known process in the melt, in solution or in suspension while stirring. Suitable solvents are aliphatic or cycloaliphatic hydrocarbons, for example, n-hexane and cyclohexane. The polymerization is preferably carried out in the melt at a temperature in the range of from 60 to 110° C.

Catalysts that can be used in the copolymerization according to the invention are, above all, Lewis acids (as defined in Kortüm, Lehrbuch der Elektrochemie, Wiesbaden 1948, pages 300 and 301), advantageously boron trifluoride. This compound is preferably used in the form of its complex compounds, for example as etherate, oxonium fluoborate or substituted aryl-diazonium fluoborate. The concentration of the catalysts depends, in the first place, on their activity as initiator and varies from 0.0001 to 1.0, preferably 0.001 to 0.1% by weight, calculated on the total mixture. To remove the unstable chain ends the glass-reinforced copolymers according to the invention can be subjected to an alkaline degradation (as described in U.S. Pat. 3,225,005). It is advantageous to add to the glass-reinforced copolymers light and oxidation stabilizers. If desired usual additives, for example pigments and dyestuffs, may be added to the copolymers.

When comparing the mechanical properties of the glass-reinforced copolymers produced according to the invention with the properties of glass-reinforced polymers produced with the addition of non-impregnated glass fibers or with those of mixtures of impregnated glass fibers with finished copolymers, high differences are found in the tensile strength, the elongation at break, the notched bar impact strength and impact strength. Moreover, the copolymers according to the invention are harder, have a higher stiffness in torsion and a higher elastic modulus. A comparison of the values of Example 1 indicated in the table with the values of the two comparative examples reveals that the tensile strength is increased by about 40%, the elongation at break by about 100% and the notched bar impact strength and impact strength by about 60 to 80% and 80 to 100%, respectively.

The glass-reinforced copolymers according to the invention are, therefore, especially suitable for the manufacture of injection molded articles which must withstand high bending and tearing forces, for example bobbins, pump casings, rotors for fans and pumps.

The following examples serve to illustrate the invention but they are not intended to limit it thereto.

EXAMPLE 1

40 milliliters of $BF_3$ di-n-butyl etherate as catalysts (diluted with cyclohexane in a ratio of 1:40) were added to a mixture of 1,600 grams of trioxane, 40 grams of ethylene oxide and 400 grams of glass fibers having a thickness of 9 microns and an average length of 0.2 millimeter, which fibers had been impregnated with trimethoxy-[3-(2,3-epoxy-propyloxy)-propyl]-silane. The mixture was polymerized for 60 minutes in a closed vessel while stirring in a bath having a constant temperature of 70° C. The polymer powder obtained was ground and to remove the unstable chain ends and residual monomer it was treated for 30 minutes at 140 to 145° C. under pressure in water containing 1% by weight of ammonia. After cooling the polymer was filtered off with suction, washed with water until it was neutral and dried at 50 to 70° C. under reduced pressure. The yield of polymer was 1,875 grams. The physical and mechanical values of the polymer are summarized in the following table.

COMPARATIVE EXAMPLE 1

30 milliliters of $BF_3$ di-n-butyl etherate (diluted with cyclohexane in a ratio of 1:40) were added as catalyst to a mixture of 1,600 grams of trioxane, 40 grams of ethylene oxide and 400 grams of glass fibers having a thickness of 9 microns and a medium length of 0.2 millimeter, which fibers were free from size and coupling agent. The mixture was polymerized for 60 minutes in a closed vessel while stirring in a bath having a constant temperature of 70° C. The polymer powder obtained was ground and to remove the unstable chain ends and residual monomer it was treated for 30 minutes at 140 to 145° C. under pressure with water containing 1% by weight of ammonia. After cooling the polymer was filtered off with suction, washed with water until it was neutral and dried at 50 to 70° C. under reduced pressure. The yield of polymer was 1,867 grams. The physical and mechanical values of the polymer are summarized in the table.

COMPARATIVE EXAMPLE 2

An analogous polymer was intimately mixed with the same glass fibers which had been impregnated with trimethoxy-[3-(2,3-epoxy-propyloxy)-propyl]-silane and the mixture was granulated. The mechanical values found are indicated in the table.

EXAMPLE 2

In the manner described in Example 1, 680 grams of trioxane, and 20 grams of diethylene glycol formal were polymerized in the presence of 300 grams of glass fibers impregnated with pentamethyl-(3,4-epoxybutyl)-disiloxane, using 25 milliliters of $BF_3$ di-n-butyl etherate (diluted with cyclohexane in a ratio of 1:40) as catalyst. After alkaline degradation the yield amounted to 865 grams. The mechanical values of the product are indicated in the table.

EXAMPLE 3

In the manner described in Example 1, 1,700 grams of trioxane were polymerized with 100 grams of 1,4-butanediol formal in the presence of 300 grams of glass fibers which had been impregnated with heptamethyl-[3-(2,3-epoxy-propyloxy)-propyl]-trisiloxane, using 40 milliliters of $BF_3$ di-n-butyl etherate (diluted with cyclohexane in a ratio of 1:40) as catalyst. After alkaline degradation the yield amounted to 1,892 grams. The mechanical values of the product are indicated in the table.

EXAMPLE 4

In the manner described in Example 1, 730 grams of trioxane were polymerized with 20 grams of ethylene oxide in the presence of 250 grams of glass fibers having a thickness of 6 microns and an average length of 0.3 millimeter, which glass fibers had been impregnated with methyl-tris-[3-2,3-epoxy-propyloxy)-propyl]-silane, using 25 milliliters of $BF_3$ di-n-butyl etherate (diluted with cyclohexane in a ratio of 1:40) as catalyst. After alkaline degradation the yield amounted to 872 grams. The mechanical values of the product are indicated in the table.

TABLE

|  | Comparative Example 1 | Comparative Example 2 | Example 1 | Example 2 | Example 3 | Example 4 |
|---|---|---|---|---|---|---|
| Proportion of glass fibers, percent by weight | 21.9 | 21.6 | 21.6 | 30.2 | 16.0 | 25.1 |
| Torsional strength, kg./cm.$^2$ | 1,940 | 1,950 | 2,100 | 2,420 | 1,930 | 2,210 |
| Ball indentation hardness, kg./cm.$^2$ | 1,450 | 1,500 | 1,635 | 1,780 | 1,610 | 1,700 |
| Elastic modulus, kg./cm.$^2$ | 53,000 | 54,000 | 59,000 | 69,000 | 58,000 | 67,000 |
| Tensile strength, kg./cm.$^2$ | 540 | 545 | 740 | 795 | 720 | 760 |
| Elongation at break, percent | 4 | 5 | 8 | 7 | 9 | 8 |
| Notched impact strength, cmkg./cm.$^2$ | 3.3 | 3.5 | 5.5 | 5.3 | 5.8 | 5.0 |
| Impact strength, cmkg./cm.$^2$ | 19 | 15 | 35 | 30 | 37 | 34 |

What is claimed is:

1. A process for making glass-reinforced copolymers of trioxane which comprises polymerizing at a temperature in the range of from −50 to +110° C. in the presence of a cationic catalyst 30 to 94.5% by weight of trioxane, 0.1 to 20% by weight of cyclic ethers or cyclic acetals in admixture with 5 to 50% by weight of glass fibers, which fibers have been impregnated with epoxide group-containing silanes or siloxanes.

2. Glass-reinforced copolymers of trioxane made from 30 to 94.5% by weight of trioxane, 0.1 to 20% by weight of cyclic ethers or cyclic acetals and 5 to 50% of glass fibers impregnated with epoxide group-containing silanes or siloxanes.

3. A process for making glass-reinforced copolymers of trioxane which comprises polymerizing at a temperature in the range of from −50 to +110° C. in the presence of a cationic catalyst 30 to 94.5% by weight of trioxane, 0.1 to 20% by weight of cyclic ethers or cyclic acetals in admixture with 5 to 50% by weight of glass fibers, which fibers have been impregnated with silanes or siloxanes having 1 to 3 silicon atoms and 1 to 3 epoxide groups.

4. A process according to claim 3 wherein the glass fibers are impregnated with an epoxy-propyloxy silane.

5. A process according to claim 3 wherein the glass fibers are impregnated with an epoxybutyl-disiloxane.

6. Glass-reinforced copolymers of trioxane made from 30 to 94.5% by weight of trioxane, 0.1 to 20% by weight of cyclic ethers or cyclic acetals and 5 to 50% by weight of glass fibers impregnated with silane or siloxane having 1 to 3 carbon atoms and 1 to 3 epoxide groups.

References Cited

UNITED STATES PATENTS 3,367,916  2/1968  Von der Emden et al.
3,422,073  1/1969  Pregaglia et al.

MORRIS LIEBMAN, Primary Examiner

L. T. JACOBS, Assistant Examiner